(12) United States Patent
Greenberg et al.

(10) Patent No.: US 6,899,022 B2
(45) Date of Patent: May 31, 2005

(54) FRUIT JUICER

(76) Inventors: Ilan Greenberg, 15 Geula Street, Haifa (IL), 33198; Zion Azar, 17 Nurit Street, Shoham (IL), 73142; Pinchas Shalev, 13 Kdumin Street, Kfar-Saba (IL), 44244

( * ) Notice: Subject to any disclaimer, the term of this patent is extended or adjusted under 35 U.S.C. 154(b) by 0 days.

(21) Appl. No.: 10/608,821

(22) Filed: Jun. 27, 2003

(65) Prior Publication Data

US 2004/0261633 A1 Dec. 30, 2004

(51) Int. Cl.[7] .............................. A47J 43/14; A23N 1/00
(52) U.S. Cl. .............................. 99/505; 99/502; 99/495
(58) Field of Search .................... 99/506, 507, 501, 99/502, 505, 495

(56) References Cited

U.S. PATENT DOCUMENTS

| | | | |
|---|---|---|---|
| 1,747,641 A | * | 2/1930 | Morris ........................ 99/505 |
| 2,195,828 A | * | 4/1940 | Salz ........................... 99/505 |
| 2,487,043 A | * | 11/1949 | Corbitt ........................ 99/505 |
| 4,106,401 A | | 8/1978 | Ackeret |
| 4,125,064 A | | 11/1978 | Ackeret |
| 4,530,277 A | | 7/1985 | Matsumoto |
| 4,711,167 A | | 12/1987 | Sano |
| 5,461,969 A | | 10/1995 | Cretsinger |
| 6,138,556 A | | 10/2000 | Yu et al. |

FOREIGN PATENT DOCUMENTS

JP 2002-125847 5/2002

* cited by examiner

*Primary Examiner*—Reginald L. Alexander
(74) *Attorney, Agent, or Firm*—Fenster & Company

(57) ABSTRACT

A juicer for extracting juice from a fruit comprising a juicing element having an axis and a pivot operatively associated with and radially spaced from the juicing element axis, such that the juicing element axis is rotatable about the pivot.

21 Claims, 19 Drawing Sheets

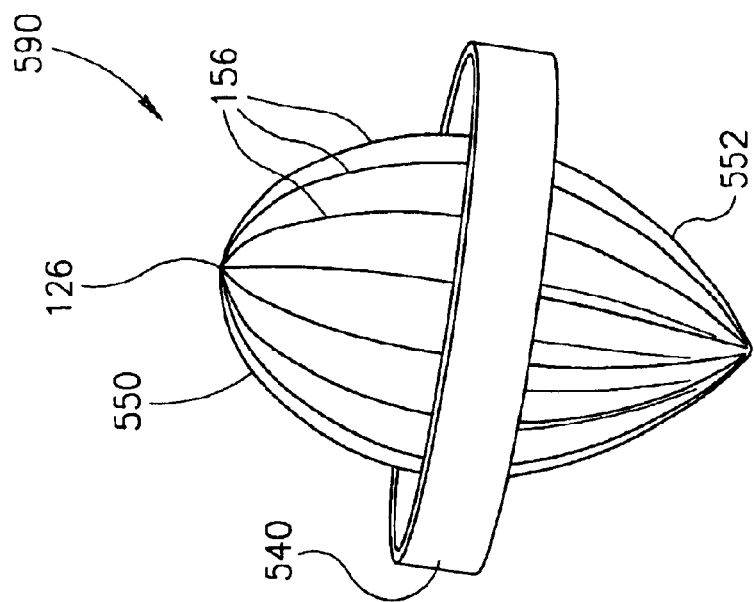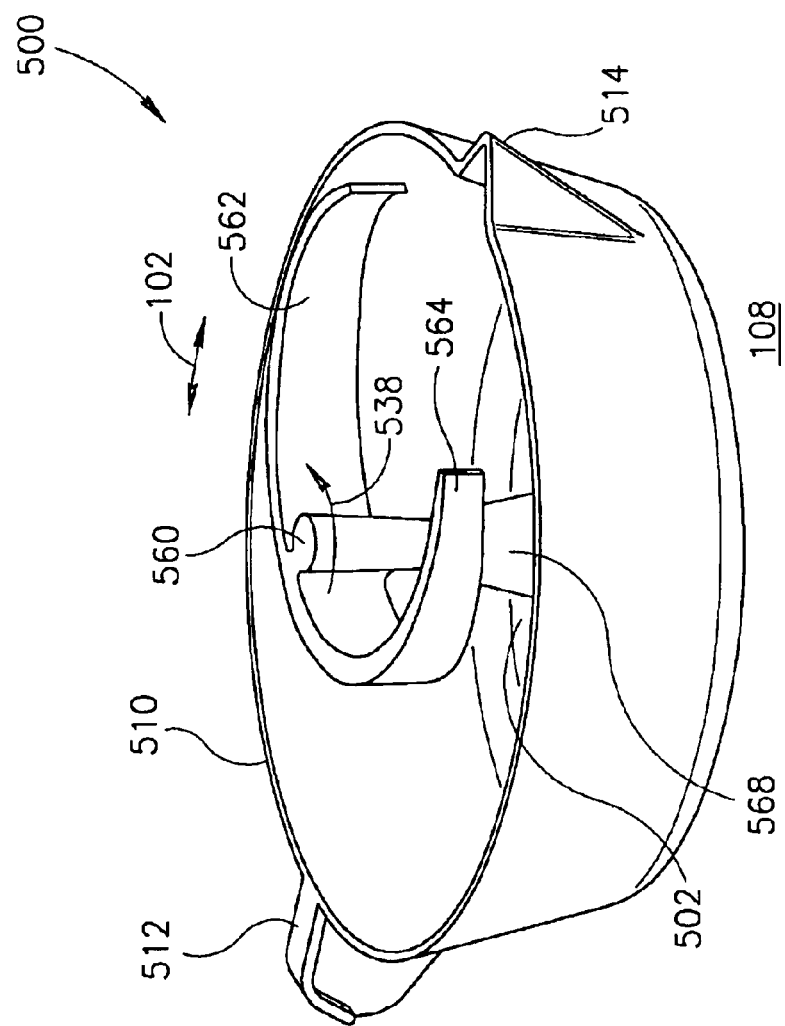

FRUIT JUICER

FIELD OF THE INVENTION

The present invention relates to manually operated fruit juicers.

BACKGROUND OF THE INVENTION

Manually operated fruit juicers typically comprise a juicing element projecting above a juicer in which juice extracted from a fruit is collected. To extract juice, the fruit is grasped in one hand, pressed down on the juicing element and the wrist joint is repeatedly twisted, thereby rotating the fruit around the juicing element. The relatively high forces and repetitive motions required during juice extraction may result in pain and inflammation of the wrist joint and/or aggravation of osteoarthritis or rheumatoid arthritic symptoms.

Motor driven juicers, though easy to operator, are often bulkier than manual juicers, making them less desirable for use in smaller kitchens, for example in efficiency units. Additionally, the added weight of the motor may make them less desirable for use by an elderly person. Also, motor driven juicers are much more expensive to buy and maintain.

SUMMARY OF THE INVENTION

An aspect of an embodiment of the present invention relates to providing a manual fruit juicer comprising a juicing element projecting upward from a juicer, the juicing element adapted to rotate relative to the fruit as the juicing element is pushed away from or pulled toward an operator.

In an exemplary embodiment, a pivot rotatably projects below the juicer. The pivot is separated by a distance from an axis through the center of the juicing element. The pivot serves to rotatably anchor the juicer to a support surface, for example a countertop. A fruit is placed on the juicing element. With each pull or push, the juicing element rotates around the pivot in a clockwise or counterclockwise fashion rotating the juicing element with respect to the fruit and extracting juice from the fruit. As the forward and backward motions are provided primarily by the shoulder and elbow muscles and joints, twisting of the wrist joint is substantially eliminated.

In an exemplary embodiment, the juicing element comprises a conical surface that is curved in a plane including the juicing element axis, thereby forming an apex. Optionally one or more elongate ridges are formed on the curved conical surface and have a direction substantially toward the apex.

In an exemplary embodiment, the pivot comprises a suction cup rotatably connected to the lower surface of the juicer. The suction cup serves to rotatably anchor the juicer to a support surface. In other embodiments, the pivot comprises a peg having a friction surface that interfaces with the support surface or inserts into a depression in the support surface. In still other embodiments, for example where the support surface comprises a free edge, the pivot comprises a clip or a vice.

In an exemplary embodiment, the juicer is glidingly supported by one or more gliders projecting below the juicer and adapted to glide on the support surface. Optionally, the interface between the one or more gliders and the support surface comprises a wheel or a low friction interface, for example a Teflon glide surface. In an exemplary embodiment, the gliders and/or the pivot are removably attached to the juicer to facilitate cleaning.

In an exemplary embodiment, the juicer comprises a dish having a receptacle attached to the lower surface of the dish from which the juicing element projects. Optionally the receptacle is removably attached to the dish lower surface. Optionally, the dish is formed with one or more perforations that allow extracted juice to drain into the receptacle from the dish. Optionally, the one or more perforations are adapted to strain the juice as the juice passes through the slots to the receptacle below. In an exemplary embodiment, the gliders and/or pivot are removably attached to the lower surface of the receptacle.

Optionally, an edge portion of the dish comprises an aperture, such that juice can be poured from the receptacle without removing the dish from the receptacle. Optionally, the aperture is located in a corner of the dish so the corner acts as a sluice to direct the collected juice toward the aperture as the juicer is tilted and juice is poured out. There is thus provided, a juicer for extracting juice from a fruit, comprising a juicing element having an axis and a pivot operatively associated with and radially spaced from the juicing element axis, such that the juicing element axis is rotatable about the pivot. Optionally, the juicing element projects above the dish.

In an exemplary embodiment, the pivot is situated beneath the dish. In an exemplary embodiment, the pivot comprises at least one suction cup. Optionally, the dish comprises a lower surface and the pivot is removably connected to the lower surface.

In an exemplary embodiment, the juicer includes one or more gliders projecting from the lower surface. In an exemplary embodiment, the one or more gliders comprise at least one wheel. Optionally, the one or more gliders are removably connected to the lower surface.

In an exemplary embodiment, the juicing element comprises a conical surface. Optionally, the conical surface is curved in a plane that includes the axis of the juicing element, the curvature forming an apex. Optionally, the conical surface comprises one or more elongate ridges formed on the conical surface. Optionally, the one or more elongate ridges have a direction substantially toward the apex along the conical surface.

In an exemplary embodiment, the juicing element is removably attached to the dish. Optionally, the juicer includes one or more clips that stabilize the juicing element on the dish.

In an exemplary embodiment, the juicer includes one or more curbs projecting from the dish that stabilize the juicing element on the dish. In an exemplary embodiment, the juicer includes a receptacle situated beneath the dish, the receptacle having at least one upper surface, at least a portion of which is associated with receiving juice and at least one lower surface, the pivot projecting below said lower surface.

Optionally, the pivot is removably connected to the lower surface. Optionally, the pivot comprises at least one suction cup. Optionally, the receptacle is removably attached to the dish. Optionally, the juicer includes one or more gliders that are connected to the lower surface.

In an exemplary embodiment, the dish is formed with one or more perforations, such that extracted juice flows through the one or more perforations onto the receptacle. In an exemplary embodiment, the one or more perforations are adapted to at least partially strain the juice as the juice passes through the one or more perforations to the receptacle.

Optionally, an edge portion of the dish is formed with an aperture, such that juice can be poured from the receptacle without removal of the receptacle from the dish. Optionally, the aperture is located in a corner of the dish so the corner acts as a sluice to direct the collected juice toward the aperture as the juicer is tilted and juice is poured out.

In an exemplary embodiment, the juicer includes a receptacle comprising a surface having a boundary and an edge projecting in an upward direction from the boundary; the pivot comprises a pivot post rotatably connected to the surface; and the juicing element projects from the post so that its axis is spaced a distance from the pivot post.

In an exemplary embodiment, the juicing element rotates around the pivot post substantially within an area defined by the edge. In an exemplary embodiment, the juicing element is freely connected to the pivot post, such that it is capable of spinning on its axis.

In an exemplary embodiment, the receptacle comprises one or more orbit gear teeth on its inside surface; and the juicing element comprises one or more perimeter gear teeth on its outer surface adapted to interface with the one or more orbit gear teeth. Optionally, the juicing element comprises at least one cone curved in a plane that includes the axis of the juicing element.

Optionally, the at least one cone comprises one or more elongate ridges. Optionally, the one or more elongate ridges have a direction substantially toward the apex. Optionally, the juicer includes a dish that projects radially outward from a lower portion of the juicing element. Optionally, the dish includes one or more perforations, such that extracted juice flows through the one or more perforations into the receptacle.

In an exemplary embodiment, the one or more perforations are adapted to at least partially strain the juice as the juice passes through the one or more perforations to the receptacle. In an exemplary embodiment, the juicing element is removably attached to the dish. Optionally, at least a portion of the dish rests on at least a portion of the edge.

In an exemplary embodiment, the juicing element comprises at least two cones, a first cone having an apex pointing in a first direction and a second cone having an apex pointing in a second direction. Optionally, the pivot post comprises one or more clips that removably connect to the juicing element. Optionally, the pivot post comprises at least one ring that removably connects to the juicing element.

In an exemplary embodiment, the at least two cones are rotatably connected to the pivot post, such that the at least two cones rotate around the rotatable connection in a substantially vertical plane. Optionally, the rotatable connection comprises an interlock for maintaining the apex of at least one cone substantially in the upright position.

In an exemplary embodiment, an upper portion of the receptacle edge comprises a perimeter projecting substantially toward the pivot post. In an exemplary embodiment, the perimeter comprises one or more slots for straining the juice. In an exemplary embodiment, the perimeter is removably attached to the receptacle.

In an exemplary embodiment, the pivot post is oblique to the surface and a portion of the pivot post contacts the perimeter. Optionally, the juicer includes a friction surface along the perimeter and a reciprocally located friction portion along the post, such that the post spins as the its friction portion moves in relation to the friction surface of the perimeter.

In an exemplary embodiment, the juicer includes a gear projecting radially from the post the juicer includes a reciprocal ratchet along the perimeter, such that the pivot post spins as the gear is moved against the ratchet. In an exemplary embodiment, the juicing element comprises at least one cone curved in a plane that includes the axis of the juicing element.

In an exemplary embodiment, the at least one cone comprises one or more elongate ridges. In an exemplary embodiment, the one or more elongate ridges have a direction substantially toward the apex.

In an exemplary embodiment, the juicing element axis post is substantially perpendicular to the surface. Optionally, the juicing element is connected by a moveable joint to an upper portion of the pivot post. Optionally, the upper portion comprises at least one ridge and the connection of the juicing element to the upper portion comprises at least one groove.

In an exemplary embodiment, the at least one ridge and the at least one groove are curved around a common radius below the juicing element.

BRIEF DESCRIPTION OF THE DRAWINGS

Exemplary non-limiting embodiments of the invention will be described with reference to the following description of embodiments in conjunction with the figures. Identical structures elements or parts that appear in more than one figure are preferably labeled with a same or similar number in all the figures in which they appear.

FIGS. 5–10 are perspective and component views of fruit juicers having dual coned juicing elements in accordance with exemplary embodiments of the invention;

DETAILED DESCRIPTION OF EMBODIMENTS

Figure 1:
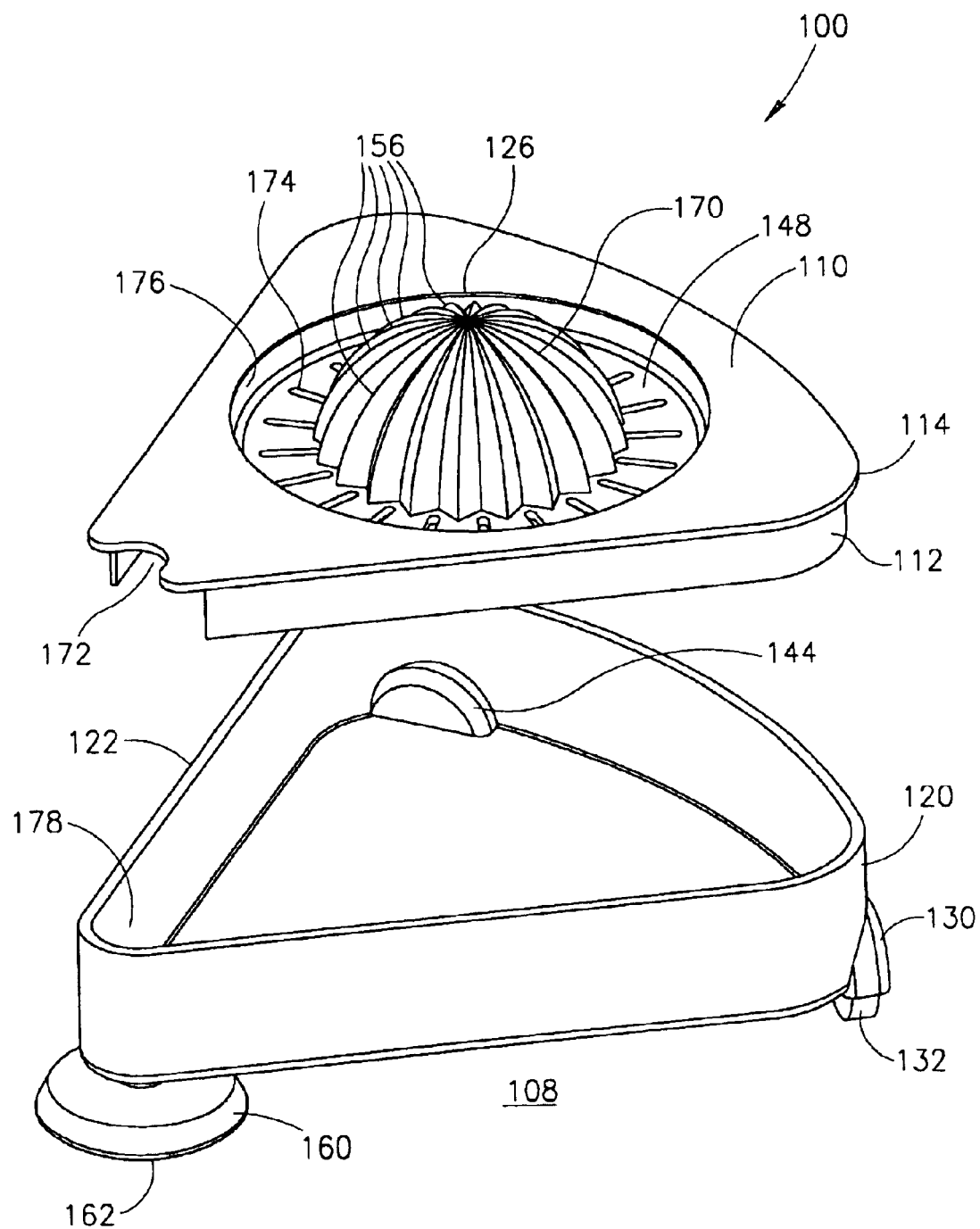
FIG. 1 is an exploded perspective view of a fruit juicer, in accordance with an exemplary embodiment of the invention.

FIG. 1 is an exploded perspective view of a fruit juicer 100 having a juicing element 170 projecting above a dish 110. In accordance with an exemplary embodiment of the invention, dish 110 is removably supported on a receptacle 120 by a lip 114. Alternatively or additionally dish 110 is centered on walls 122 of receptacle 120 by a ridge 112.

In an exemplary embodiment, receptacle 120 has a downward projecting wheel 132 (or other glider surface) rotatably attached to a well 130. Wheel 132 rotates on a support surface 108 comprising, for example, a countertop. Optionally, a pivot 160 is rotatably attached to receptacle 120 and, for example, comprises a suction cup 162 on a post 166. Suction cup 162 serves to rotatably connect a corner 178 to support surface 108 so that juicer 100 rotates around pivot 160 on wheel 132.

In an exemplary embodiment, juicing element 170 comprises a conical surface curved in a plane including an axis passing generally through an apex 126 of juicing element 170. Optionally, one or more elongate ridges 156 are formed on curved conical surface of element 170 and are directed substantially toward apex 126.

In an exemplary embodiment, receptacle 120 is formed with perforations 174 so that extracted juice flows from the dish into receptacle 120 through perforation 174. Optionally, perforations 174 are set in recess 176 that channels the extracted juice into perforations 174 and therethrough to receptacle 120. In an exemplary embodiment, perforations 174 are adapted to at least partially strain the juice as the juice passes into receptacle 120, perforations 174 for example being narrower than a typical fruit seed.

Optionally, juicer 100 includes an aperture 172 aligned, for example with corner 178. Aperture 172 allows drainage of liquid from receptacle 120 without removing dish 110 from receptacle 120. In an exemplary embodiment, corner 178 acts as a sluice as juicer 100 is tipped toward aperture 172, so that juice exits aperture 172 in a stream.

Optionally, receptacle 120, dish 110 and/or juicing element 170 comprise relatively rigid materials, for example plastic and/or metal. Additionally or alternatively, juicer 100 comprises materials that are hydrophobic, for example a smooth plastic and/or enamel surfaces thereby facilitating easy cleaning.

In an alternative embodiment, dish 110 comprises a solid surface without receptacle 120 below it. In this embodiment, pivot 160 and wheel 132 are attached directly to the lower surface of dish 110 and extracted juice collects directly in dish 110. Optionally, dish 110 is curved to facilitate juice collection and/or form a sluice that guides the extracted juice into a stream as it is poured from dish 110.

Figure 2:
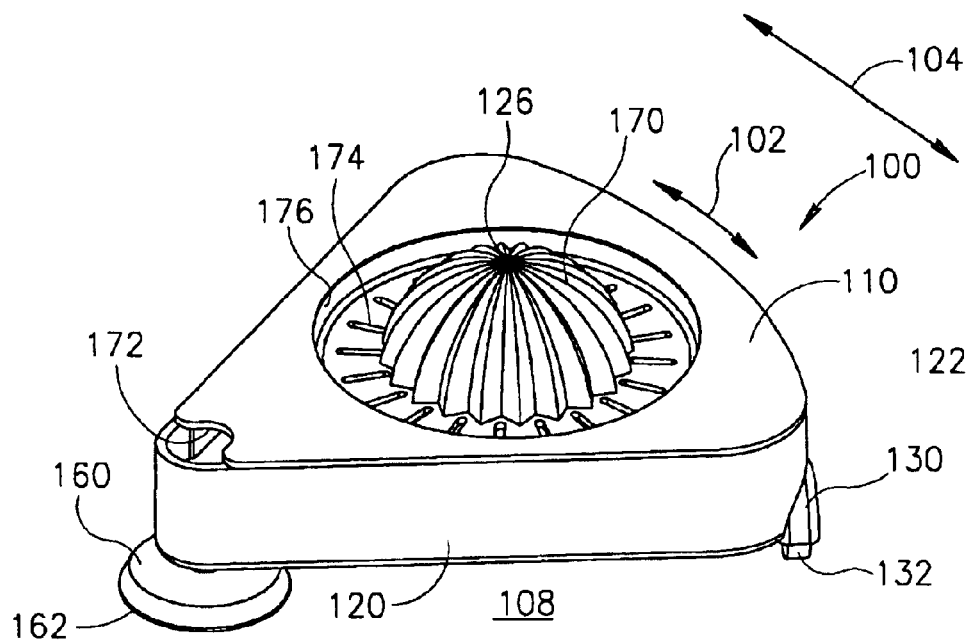
FIG. 2 is a perspective view of the assembled fruit juicer of FIG. 1, in accordance with an exemplary embodiment of the invention.

FIG. 2 is a perspective view of assembled fruit juicer 100, with arrows 102 demonstrating the rotation of juicing element 170 around pivot 160 as the fruit is moved forward and backward. Arrows 104 show the relatively straight motion of the operator's elbow as juicer 100 is rotated in directions 102.

Due to the positioning of pivot 160, substantially linear motion of the arm of the user, in direction 104, is converted into rotational movement of juicing element 170, in direction 102. Since area 178 is held in the (non-moving) hand of the user, the relative rotation of juicing element 170 with respect to the fruit removes juice and pulp from the fruit. As a result, twisting of the operator's wrist is substantially reduced over prior art fruit juicers, reducing or preventing wrist pain and/or inflammation.

Figure 3:
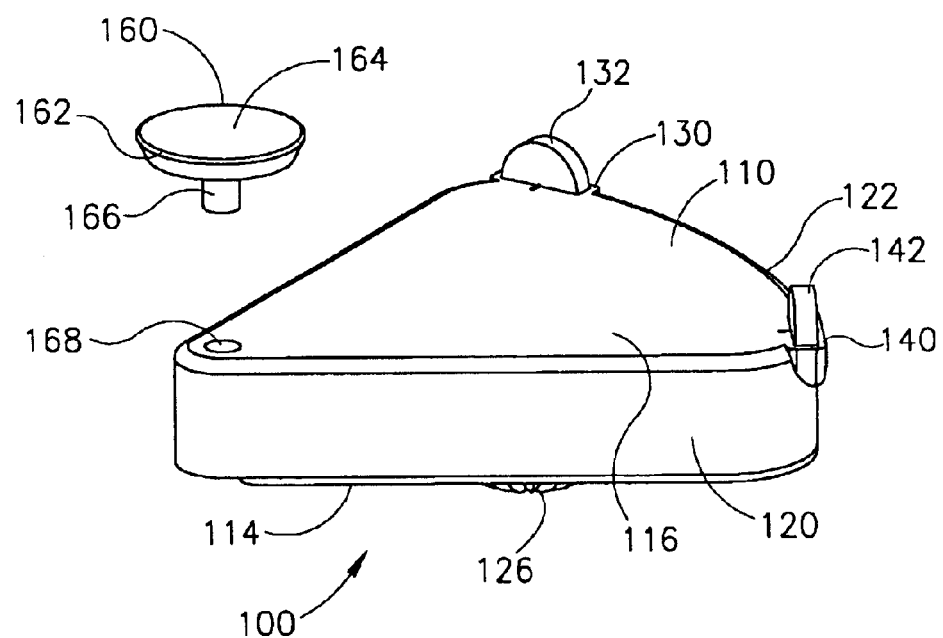
FIG. 3 is a bottom perspective view of the fruit juicer of FIG. 2, in accordance with an exemplary embodiment of the invention.

FIG. 3 is a bottom perspective view of the fruit juicer of FIG. 2, showing a second wheel 142 in wheel well 140 projecting above receptacle bottom 116. Referring back to FIG. 1, reservoir 140 may optionally have recess 144 for wheel 142 when wheel 142 is located along wall 122. Additionally or alternatively, wheels 142 and/or 132 may be recessed into, and project out of, any location along bottom 116 provided that wheels 132 and/or 142 are spaced a distance from pivot 160.

Optionally, wheels 132 and 142 are located outboard juicing element apex 126 thereby providing stability to juicer 100 during juicing. Alternatively or additionally wheels 132 and 142 are substantially distanced from each other so juicer 100 is stabilized on support surface 108 by wheels 132 and 142 and pivot 160. In an alternative embodiment, wheels 132 and 142 comprise stationary pads that have a low friction interface with surface 108, for example comprising Teflon pads. Optionally, wheels 132 and 142 or their alternative embodiments, for example Teflon pads, are removably attached to receptacle 120 to facilitate cleaning following juicing.

Optionally, suction cup 162 is made of a pliable material, for example a silicone rubber, and has curved area 164 that provides a suction to secure pivot 160 to support surface 108 (FIG. 1).

In an exemplary alternative embodiment, pivot 160 comprises friction a peg having a surface that generates friction against support surface 108, for example a silicone rubber. Alternatively or additionally one end of peg 160 fits into a post depression 168 and the other end fits into a depression in surface 108 (not shown). Whether peg 160 has friction surface, fits in a depression in surface 108 or comprises suction cup 162, juicer 100 will revolve about pivot 160 (rather than slide at pivot 160) when the operator moves the fruit linearly.

An alternative embodiment of pivot 160 comprises a vice (not shown) that is, for example, operated by screw mechanism. The vice typically secures juicer 100 to a free edge of support surface 108, for example a free edge of a counter or table (not shown). Alternatively, pivot 160 comprises a spring-loaded clip (not shown) that attaches to an edge of a counter or table. Optionally, all embodiments of pivot 160 and/or peg 148 are removable from juicer 100 to facilitate cleaning.

In an exemplary embodiment of the invention, recess 176 has a diameter of 8–15 centimeters, optionally 10–12 centimeters. The distance from the center of pivot 160 to gliders 132 and/or 142 is between 15 and 20 centimeters. The distance from pivot 160 to the center of juicing element 170 is about 10–12 centimeters so that the distance from pivot 160 to juicing element 170 is maximized. This allows for a maximum rotation of juicing element 170. In general, 20–60 degrees of rotation can be achieved with little effort. This is, in fact, greater than that achieved with stationary juicers of the prior art that rely upon twisting of the wrist for juice extraction.

Figure 4:
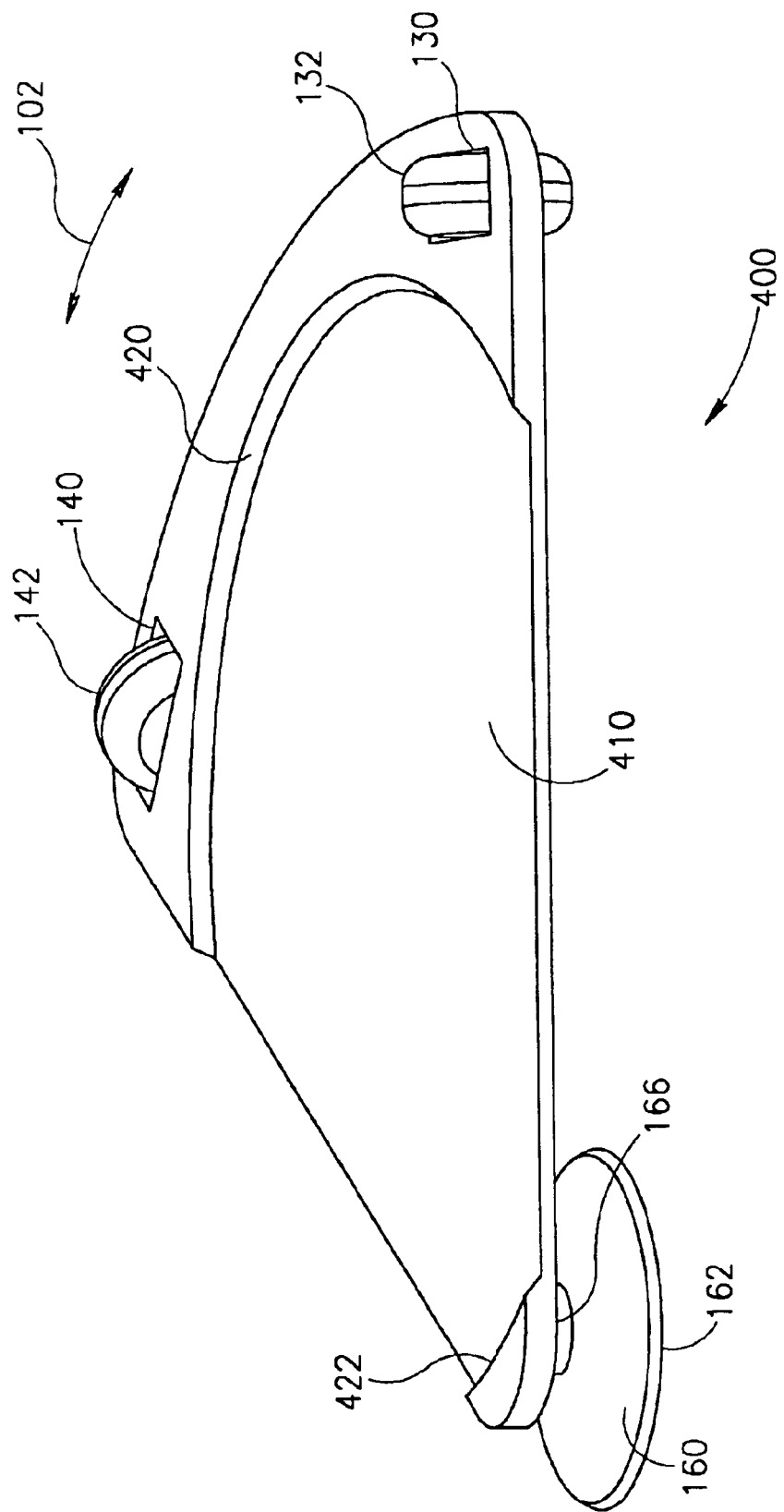
FIG. 4 is a perspective view of a juicing platform, in accordance with an exemplary embodiment of the invention.

FIG. 4 is a perspective view of a component platform 400 comprising a support surface 410 that rotates in direction 102 upon which a standard juicer is placed. A standard juicer typically comprises a dish 110 having a juicing element 170 (FIG. 1). In an exemplary embodiment, support surface 410 rotates around pivot 160 on wheels 132 and 142 in direction 102. In this manner, a standard juicer when placed on surface 410 extracts juice from a fruit in a manner similar to that described above for the embodiment of FIGS. 1–3.

Optionally, component platform 400 is a part of a kit that includes at least one standard juicer having one or more boundaries that contact curbs 420 and/or 422. Alternatively or additionally support surface 410 comprises a friction surface that holds a juicer that does not contact curbs 420 and/or 422, for example a juicer that is purchased separately. Alternatively or additionally, a variety of clips and/or alternative hardware (not shown), may be provided to hold a variety of juicer shapes and sizes.

FIGS. 5 and 6 are perspective views of a fruit juicer 500 comprising a juicing element 590 having a collar 540 that is supported by clips 562 and 564. Rotatable post 560 is rotatably connected to post base 568 that projects from a bottom surface 502 of juicer 500. As the operator swings the fruit in direction 102, post 560 rotates in a direction 538 while receptacle 510 remains relatively stationary with respect to surface 108. Since the motion of the juicing element comprises rotation around an off-center pivot, no wrist rotation is needed to provide relative rotation of the juicing element as it rotates as in the manner described in the embodiment of FIGS. 1–3.

In an alternative exemplary embodiment, juicing element clips 562 and 564 attach around a portion collar 540.

In an exemplary embodiment, juice receptacle 510 has a built-in handle 512 and/or spout 514. An exemplary application of fruit juicer 500 is for extracting juice while operating on a soft surface, for example on a table cloth. On a soft surface, for example, wheels 132 and 142 of juicer 100 may have difficulty rotating.

Figure 7:
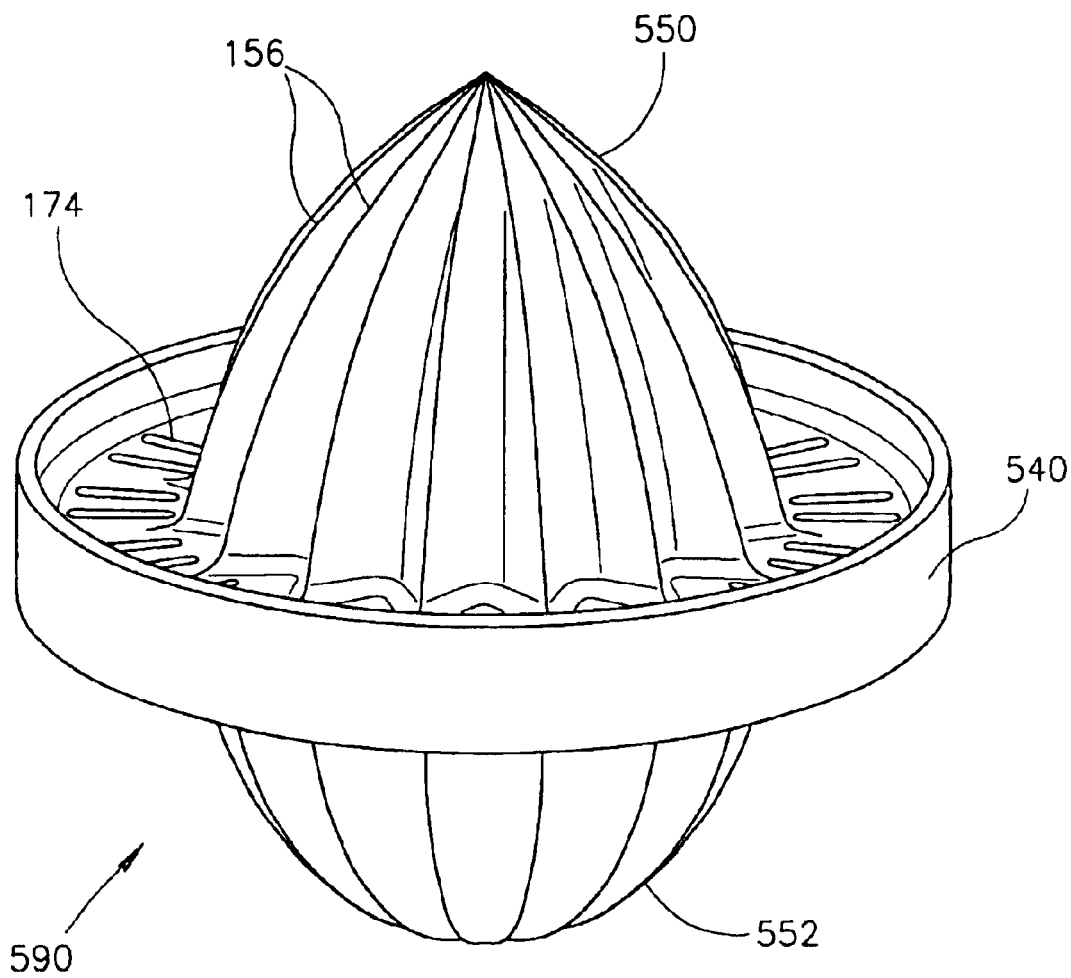

FIG. 7 is a detail of juicing element 590 having a first cone shape 550 projecting in a first direction and a second cone shape 552 projecting in a second, optionally opposite, direction. Cone shapes 550 and 552 are configured differently in size, shape or pattern of ridges 156 so they can be used for extracting juice from different fruits. For example cone shape 550 may be used for extracting juice from oranges while cone shape 552 may be used for extracting juice from lemons.

Figure 8:
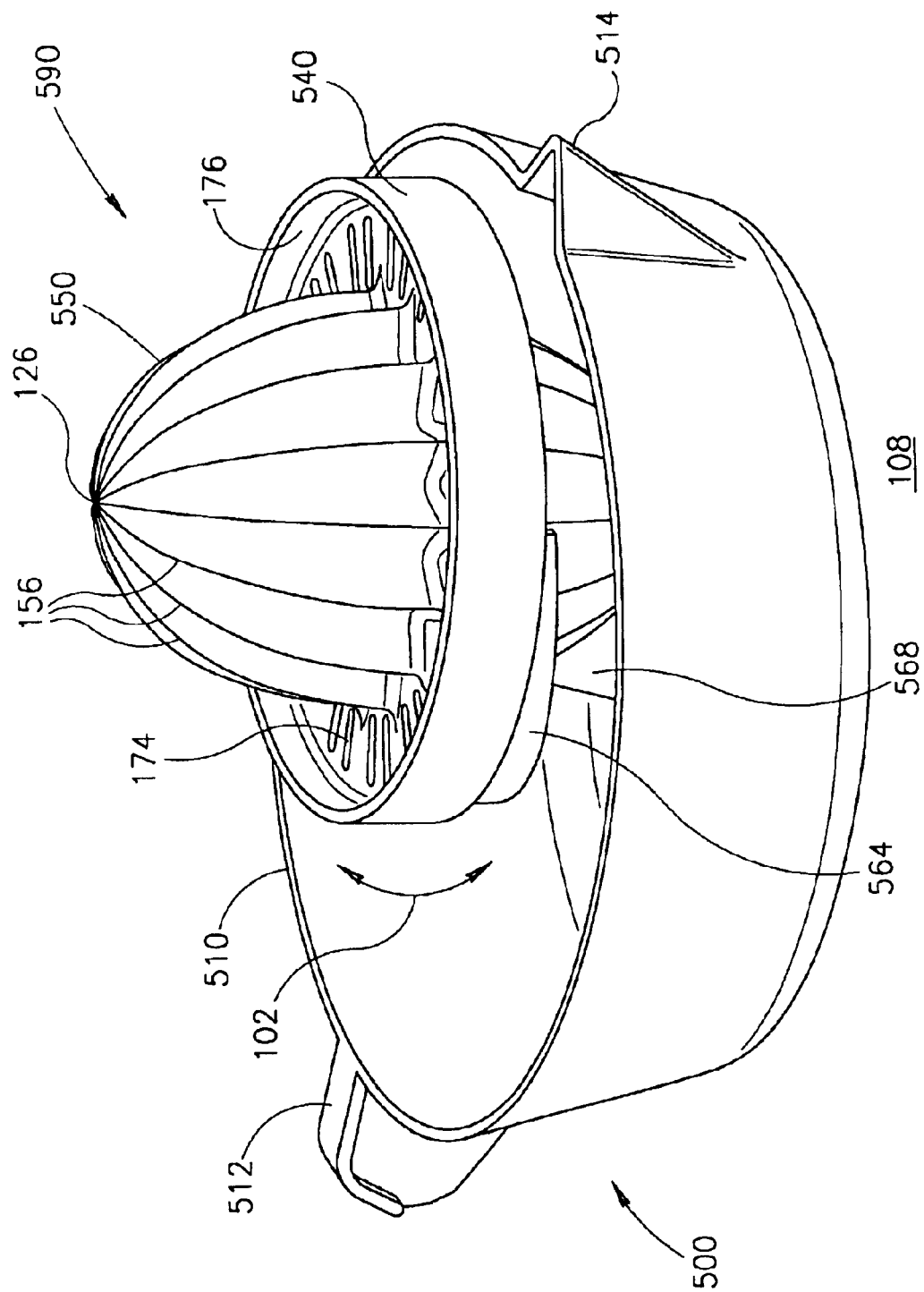

FIG. 8 is an assembled view of juicer 500 showing that as juice is extracted, recess 176 directs the juice so that passes through strainer slots 174 and into receptacle 510.

Figure 9:
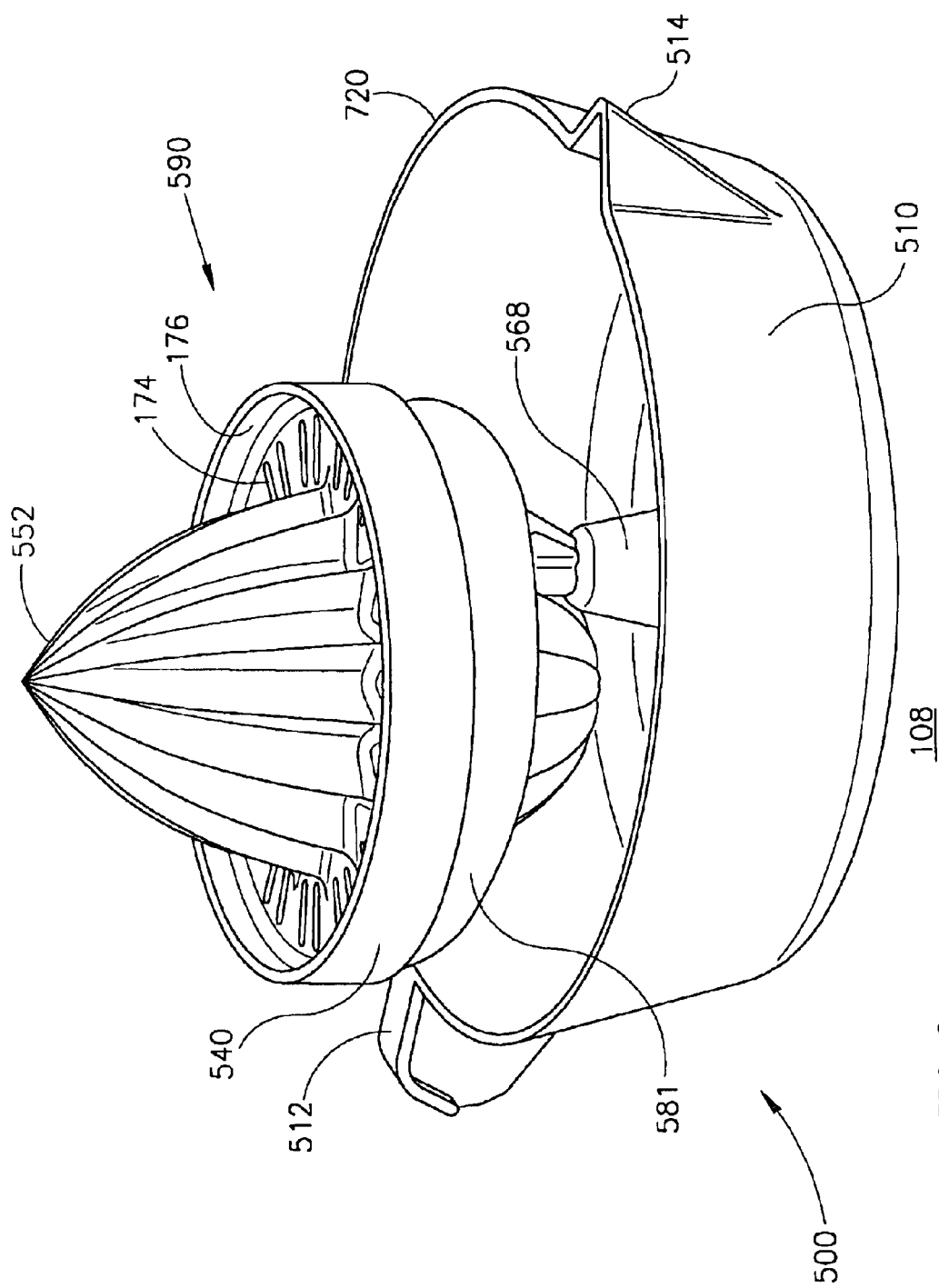

FIG. 9 is an alternative embodiment of juicer 500 in which juicing element 590 is supported by a support ring 581. Optionally, juicing element collar 540 and/or ring 581 are partially supported on receptacle rim 720 during rotation around base 568, optionally allowing greater stability of receptacle 510 on surface 108.

Figure 21:
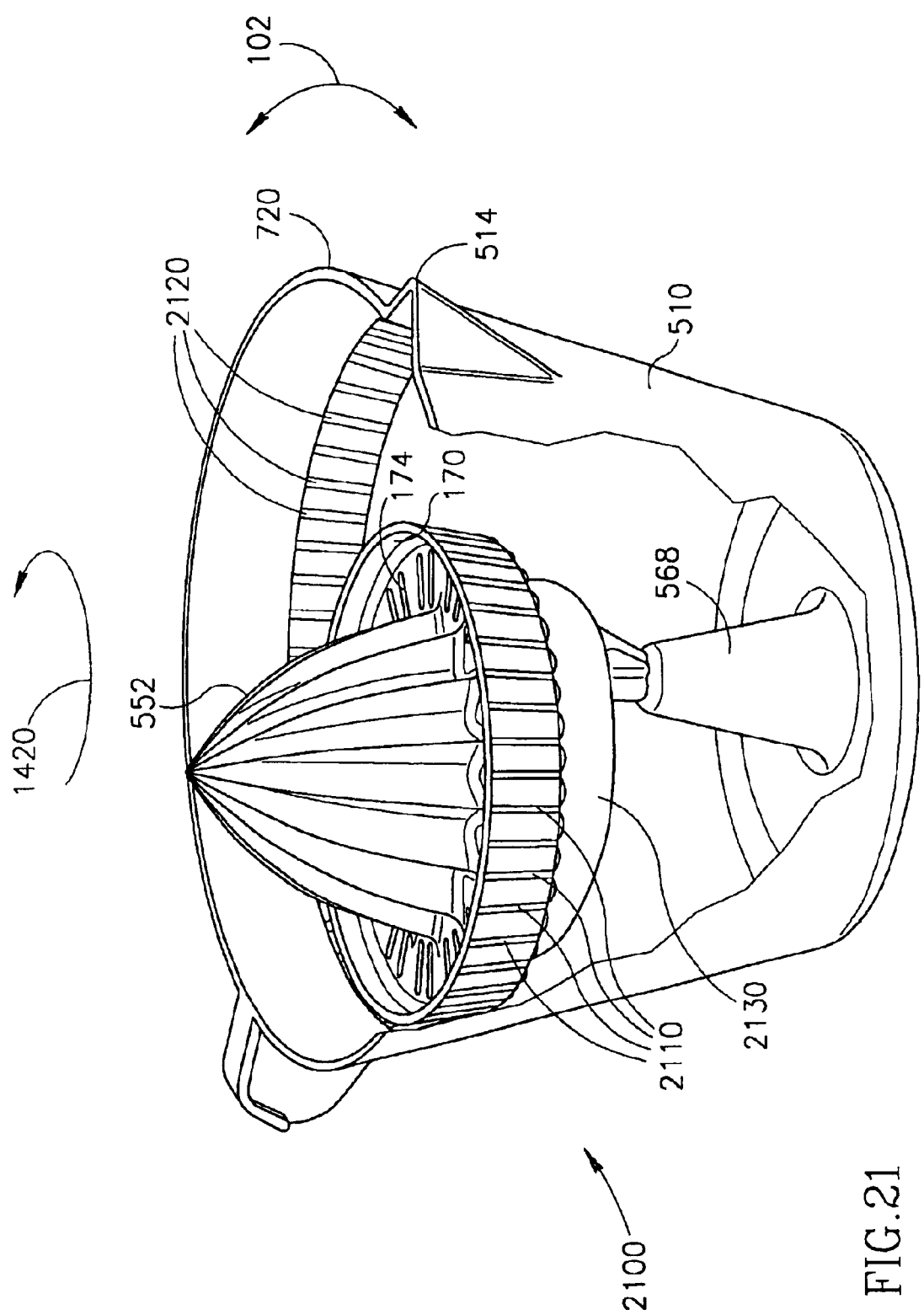
FIG. 21 is a cut-away view of a fruit juicer having an orbit gear, in accordance with exemplary embodiments of the invention.

FIG. 21 is a cut-away view of fruit juicer 2100 with juicing element 552 having perimeter gear teeth 2110 around its perimeter that interface with orbit gear teeth 2120 around the inside perimeter of receptacle 510.

Juicing element 552 is rotatably attached to a ring 2130 that rotates around base 568 as in juicer 500. In an exemplary embodiment, as juicing element 552 is pushed with the fruit in a direction 102, its perimeter teeth 2110 interface with orbit teeth 2120, causing juicing element 552 to spin in a direction 1420. Spin 1420 is comparable to the earth spinning on its axis once in 24 hours while rotation 102 is comparable to the earth's orbit around the sun.

Spin 1420 increases juice extraction speed of element 1830. Note that as in juicer 100 and other embodiments, twisting of the wrist joint is substantially eliminated as juicing element spins in direction 1420.

Figure 10:
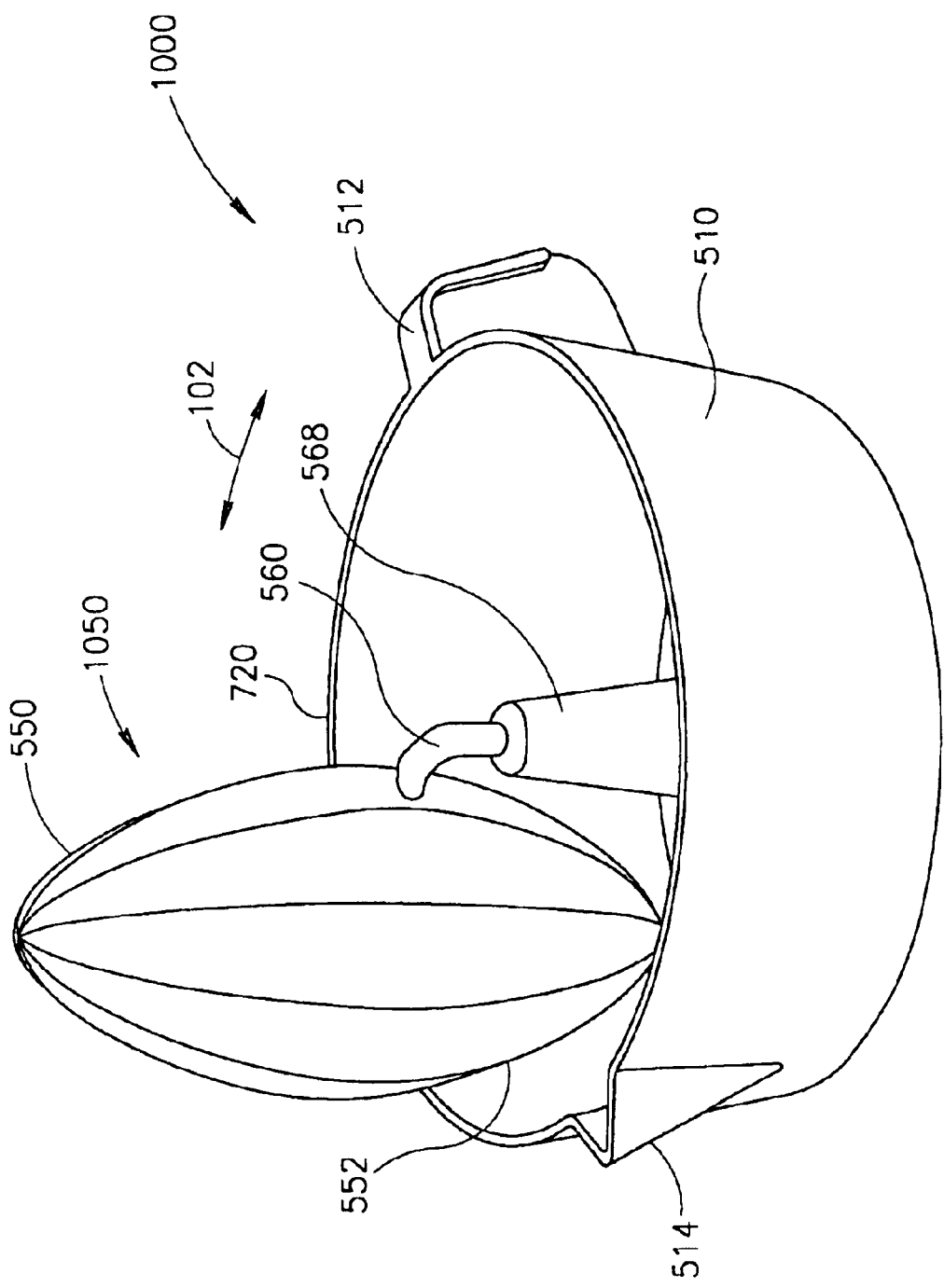

FIG. 10 is a perspective view of an exemplary embodiment a fruit juicer 1000 having a dual juicing element 1050 that rotates on a vertical plane around post 560 so that either cone 500 or 552 are in the upright position. Optionally, an interlock is included in the connection between juicing element 1050 and post 560 to disengagably lock cone 550 or 552 in the upright position. The operation of this device is essentially the same as those of FIGS. 5–9. Note the off-center pivot for juicing element 1050.

Figure 11:
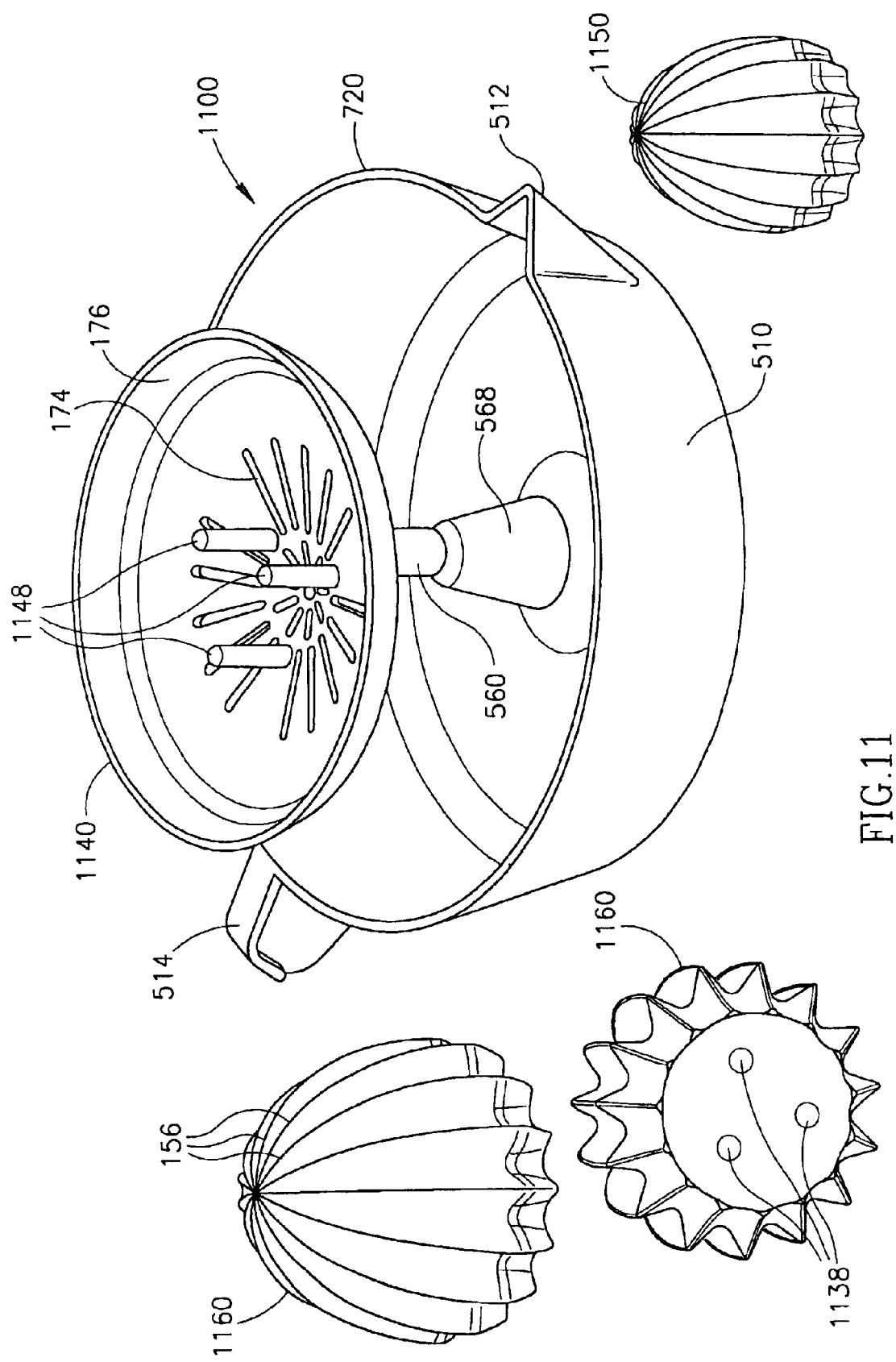
FIGS. 11–13 are perspective and component views of fruit juicers having rotating strainer bowl embodiments, in accordance with exemplary embodiments of the invention.

FIG. 11 is a perspective view of a fruit juicer 1100 comprising a strainer bowl 1140 to which a juicing element 1160 removably attaches on posts 1148. In an exemplary embodiment, the underside of cone 1160 comprises pivot post receptacles 1138. Alternatively or additionally, juicing element 1160 comprises a hollow shell and posts 1148 are shaped to interface with the underside of cone 1160. In an exemplary embodiment, juicer 1100 has at least one additional juicing cone 1150 having an alternative shape, size and/or configuration to that of cone 1160. Note that when juicing element 1150 is placed upon posts 1148, the axis passing through apex 170 is off-center from the axis of pivot post 568. As the juicing element 1150 is off-center from pivot post 568, the operation of juicer 1100 is essentially the same as previously described embodiments, for example in FIGS. 5–9.

Figure 12:
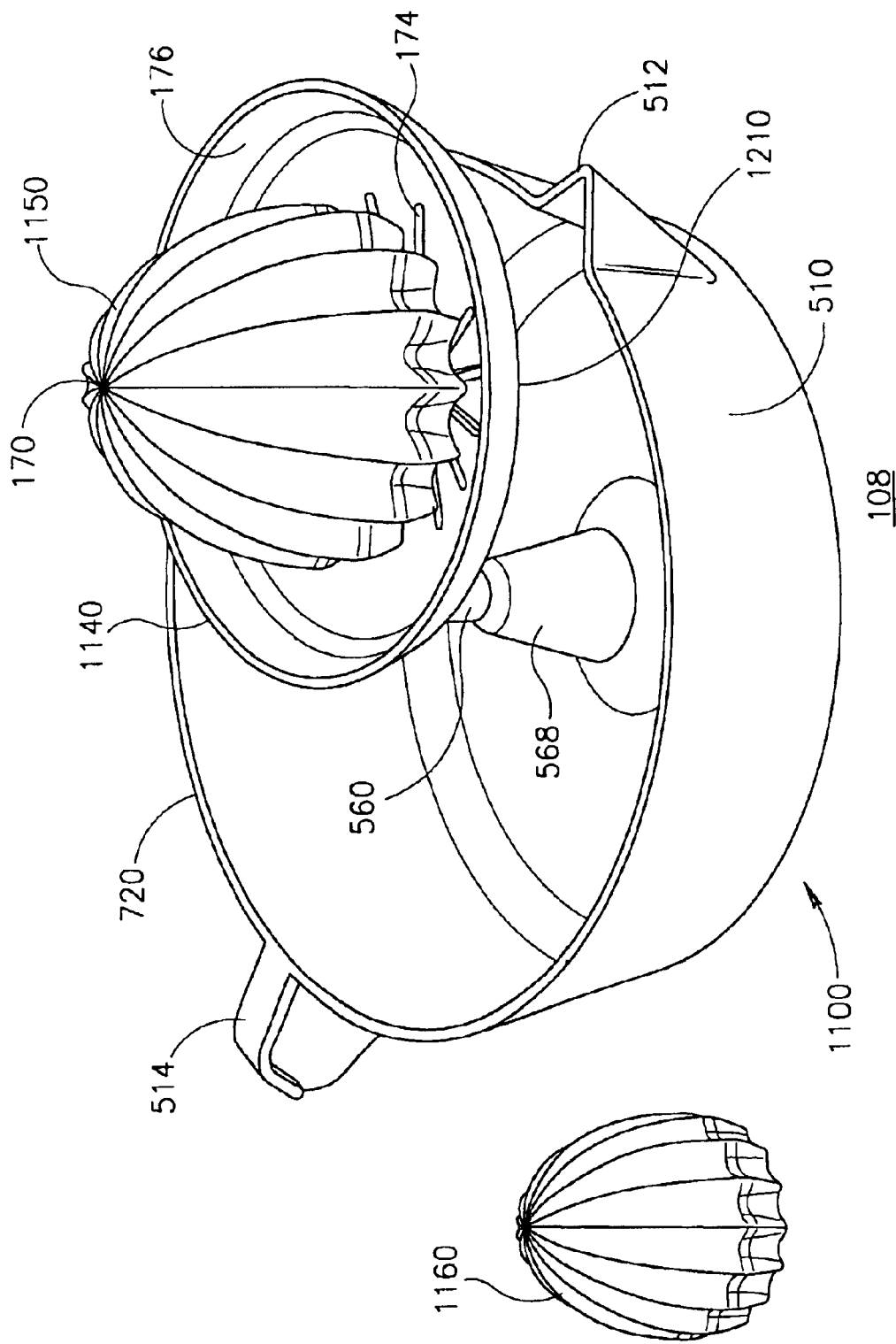

FIG. 12 is an alternative embodiment of fruit juicer 1100 in which a portion of bottom surface 1210 is partially supported on rim 720. This arrangement allows the distance between apex 170 and post 560 to be maximized while receptacle 510 remains relatively stable with respect to surface 108.

Figure 13:
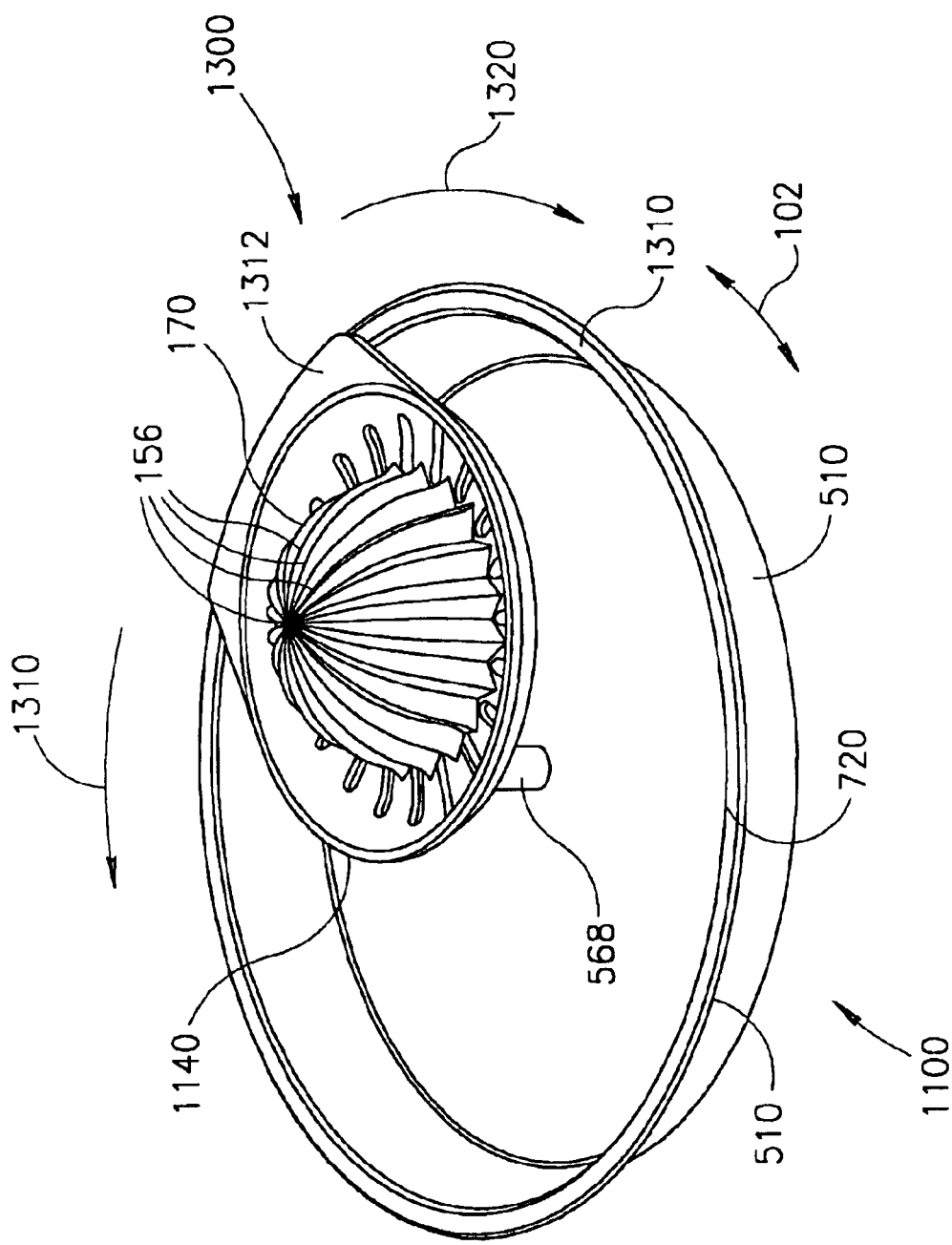

FIG. 13 is a perspective view of an alternative embodiment of a fruit juicer 1300 in which strainer bowl 1140 has a lip 1312 that slides along, and is supported by, rim 720 during rotation.

Juicing element 170 on all juicer embodiments may be rotated 360 degrees. Alternatively, element 170 can be rotated in a direction 1310 then in a direction 1320, each less than 360 degrees, for example 110 degrees or less. In each direction of rotation, no wrist rotation is required as described in other embodiments.

Figure 14:
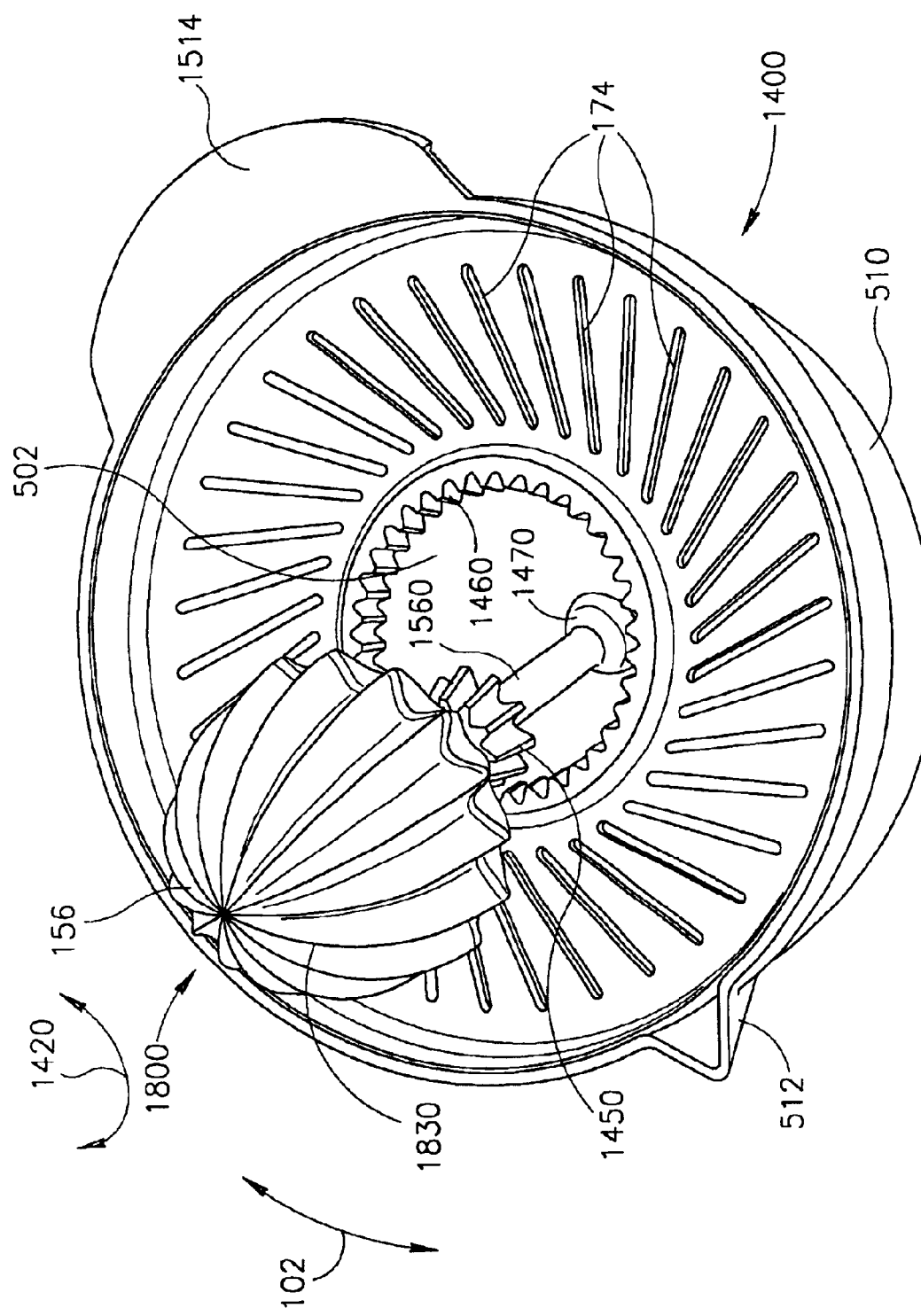
FIGS. 14–20 are perspective and component views of juicers having rotating juicing elements embodiments, in accordance with exemplary embodiments of the invention.

FIG. 14 is a perspective view of juicer 1400 having a juicing pedestal 1800 comprising a juicing element 1830 projecting from a post 1560. Post 1560 further comprises a gear 1450 that rotates against a ratchet perimeter 1460. As the fruit moves in direction 102 on top of element 1830, post gear 1450 spins. Juicing element 1830, situated at the end of post 1560 thereby spins in direction 1420.

The operation of juicer 1400 is similar to that of the earlier described embodiments in that off-axis motion in direction 102 causes relative rotation of the juicing element and fruit. Gear 1450 and ratched 1460 cause additional (faster) spin of the juicing element 1830 in direction 1420.

In an alternative embodiment, juicer 1400 ratchet gears 1460 comprise a first friction surface and gear 1450 comprises a second friction surface that contacts surface 1460. As the first and second friction surfaces move in relation to each other, post 1560 spins.

Figure 15:
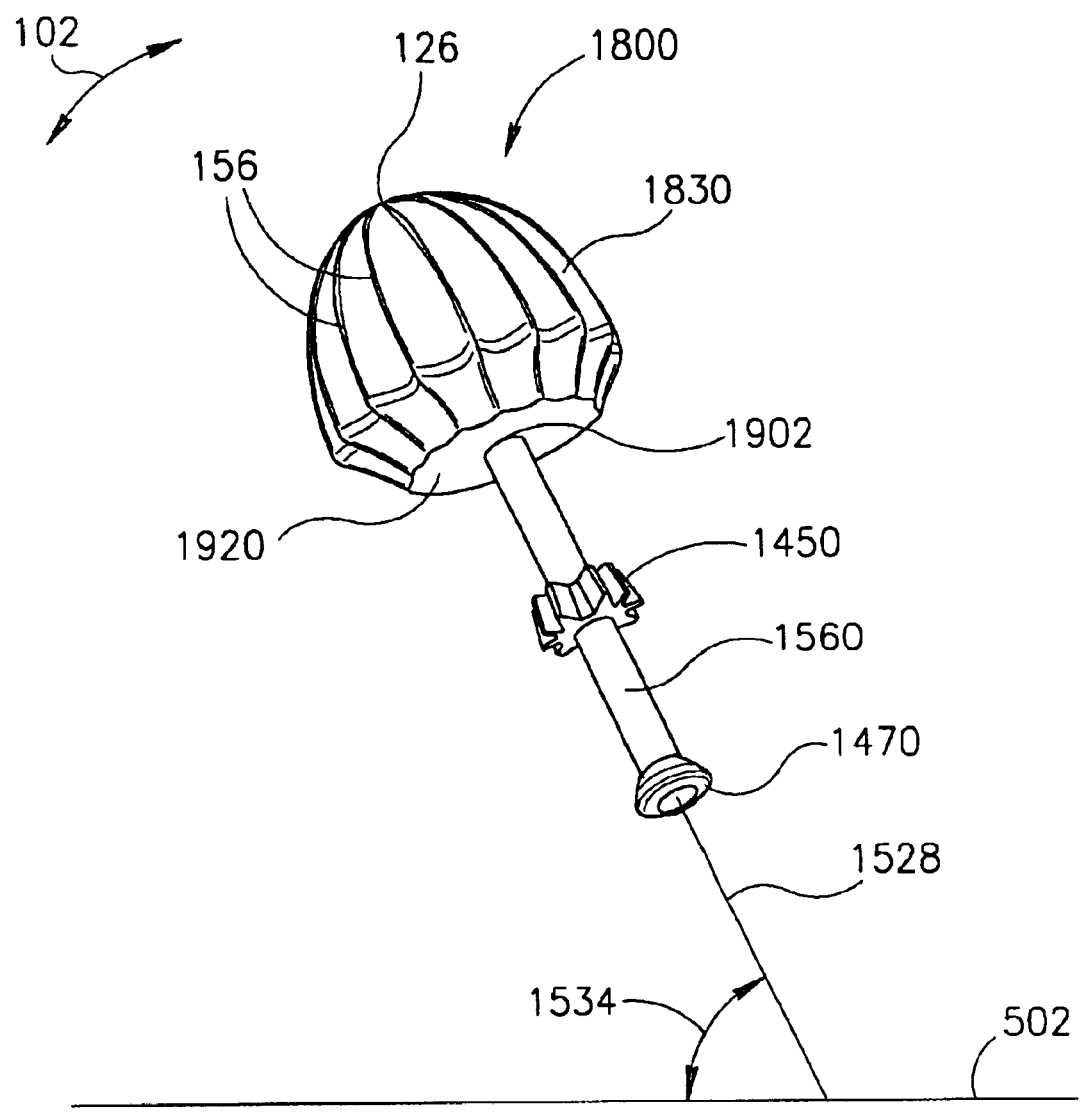

FIG. 15 is a detailed perspective view of juicing pedestal 1800 demonstrating that post 1560 projects from a bottom surface 1920 of at a junction 1902. Junction 1902 may comprise a fixed attachment between post 1560 and juicing element 1830. Alternatively or additionally, junction 1902 may be a removable connection, allowing, for example different juicing element shapes 1830 to be attached.

In an exemplary embodiment, an axis 1528 passes through post 1560 that has an angle 1534 of less than 90 degrees with respect to surface 510. Both juicing element 1830 and post 1560 maintain angle 1534 as they are rotated in direction 102 around a hub 1470.

Figure 16:
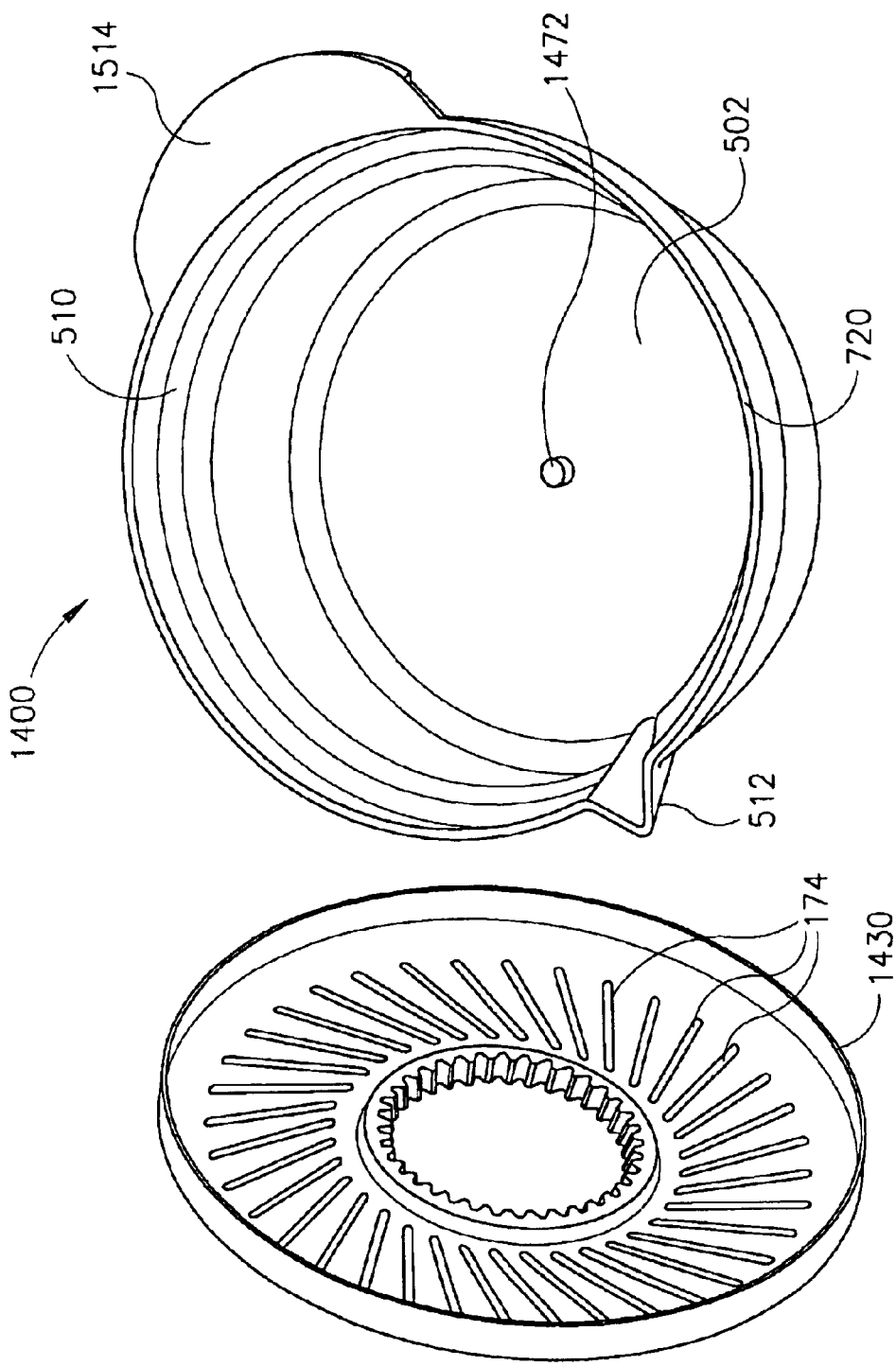

FIG. 16 is a view of receptacle 510 with a strainer ring 1430 removed, showing a pivot projection 1472 projecting from surface 502. Hub 1470, shown in FIG. 15, rotatably attaches to projection 1472 allowing it to spin around axis 1528 and rotate in direction 102 during juice extraction.

In an exemplary embodiment, strainer ring 1430 having perimeter ratchet 1460 and strainer slots 174, removably fits over receptacle 1400 to allow for easy cleaning. Optionally, receptacle 510 features a horizontal handle 1514.

Figure 17:
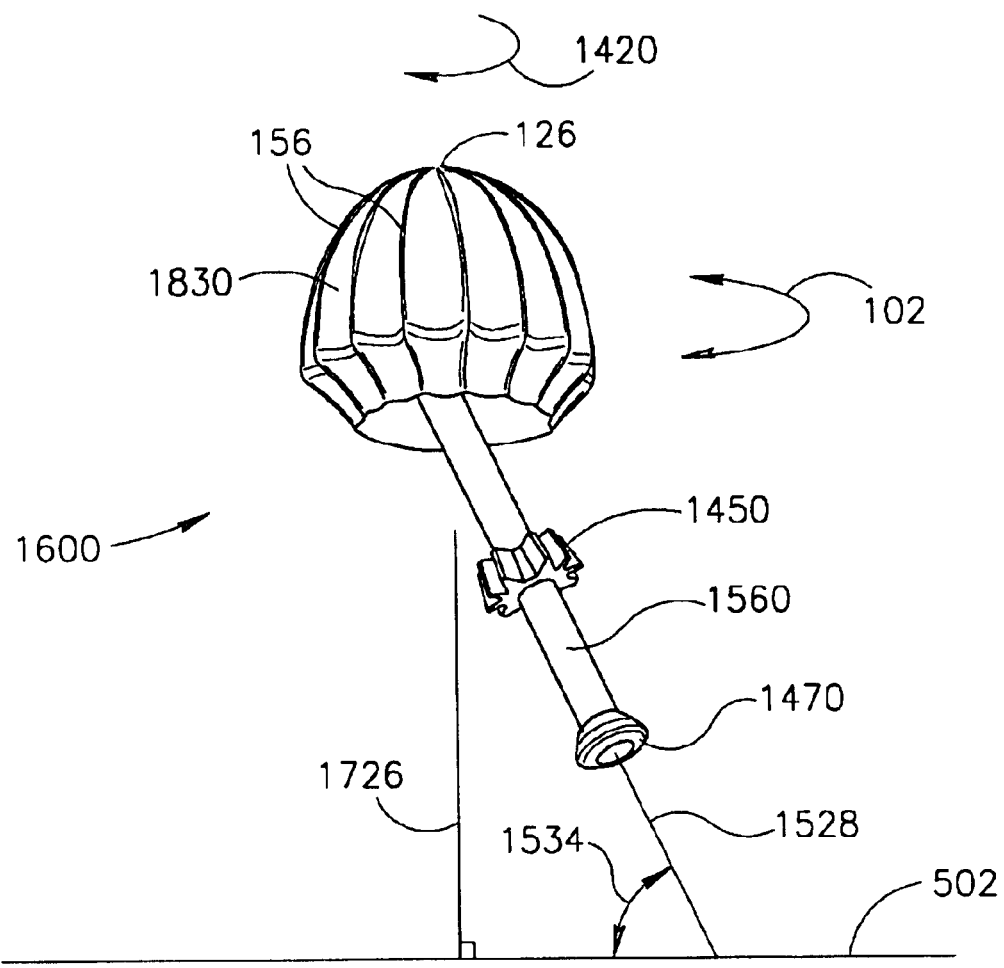
Figure 20:
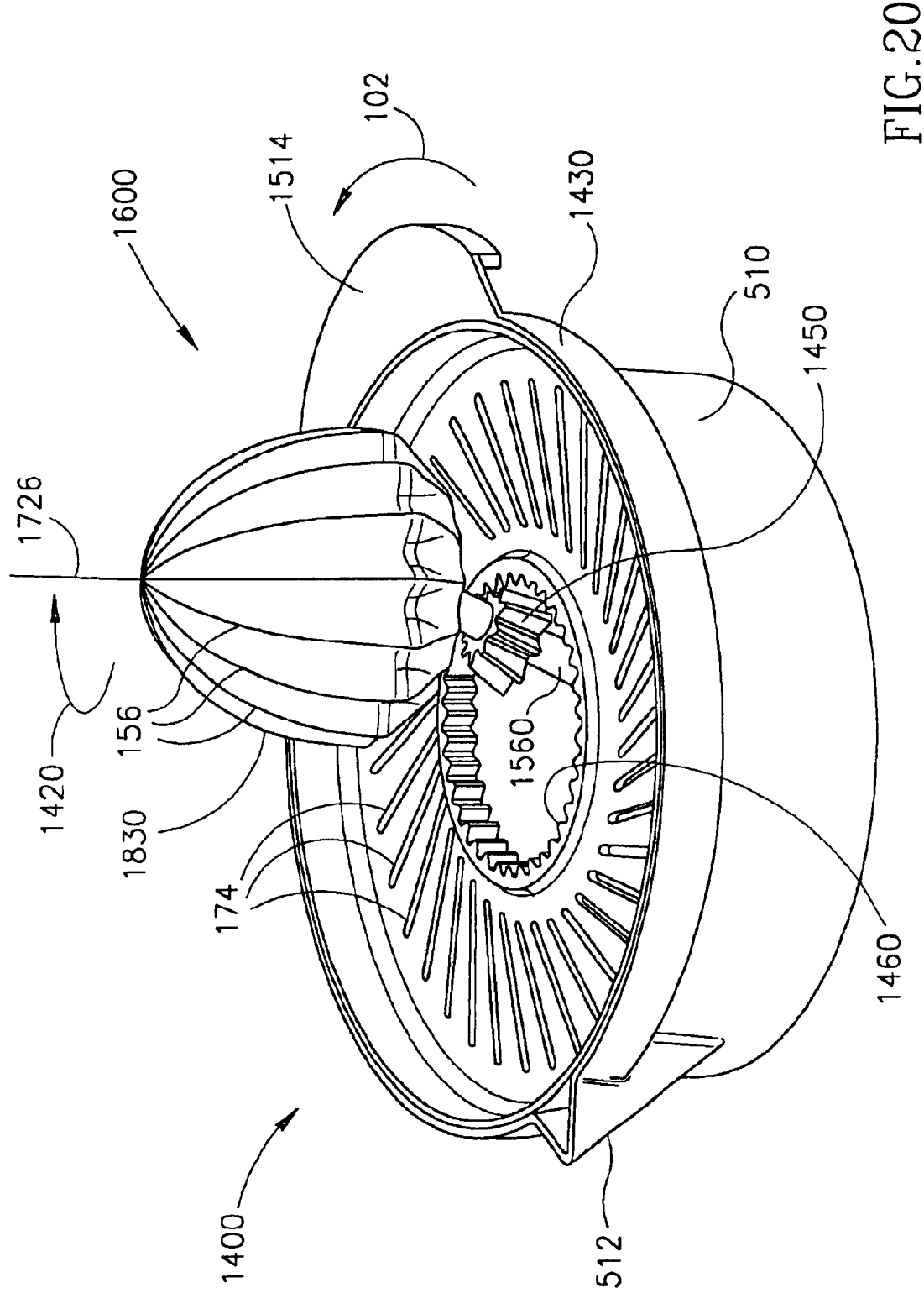

FIG. 17 is a perspective view of a juicing pedestal 1600 in an exemplary embodiment in which juicing element 1830 maintains a substantially vertical axis 1726 passing through apex 126. FIG. 20 is a perspective view of an assembled juicer 1400 with juicing element 1830 spinning in direction 1420.

Figure 18:
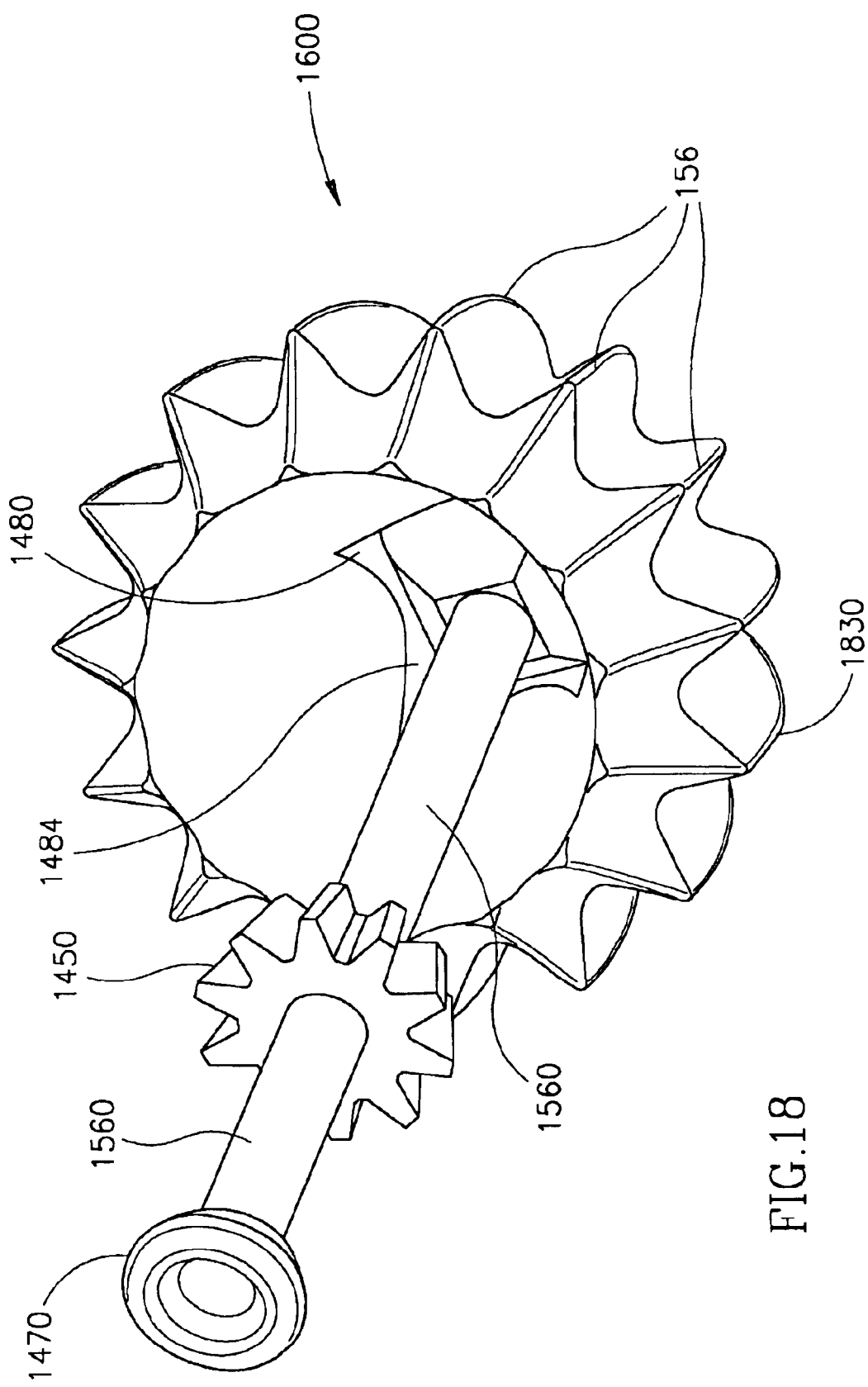
Figure 19:
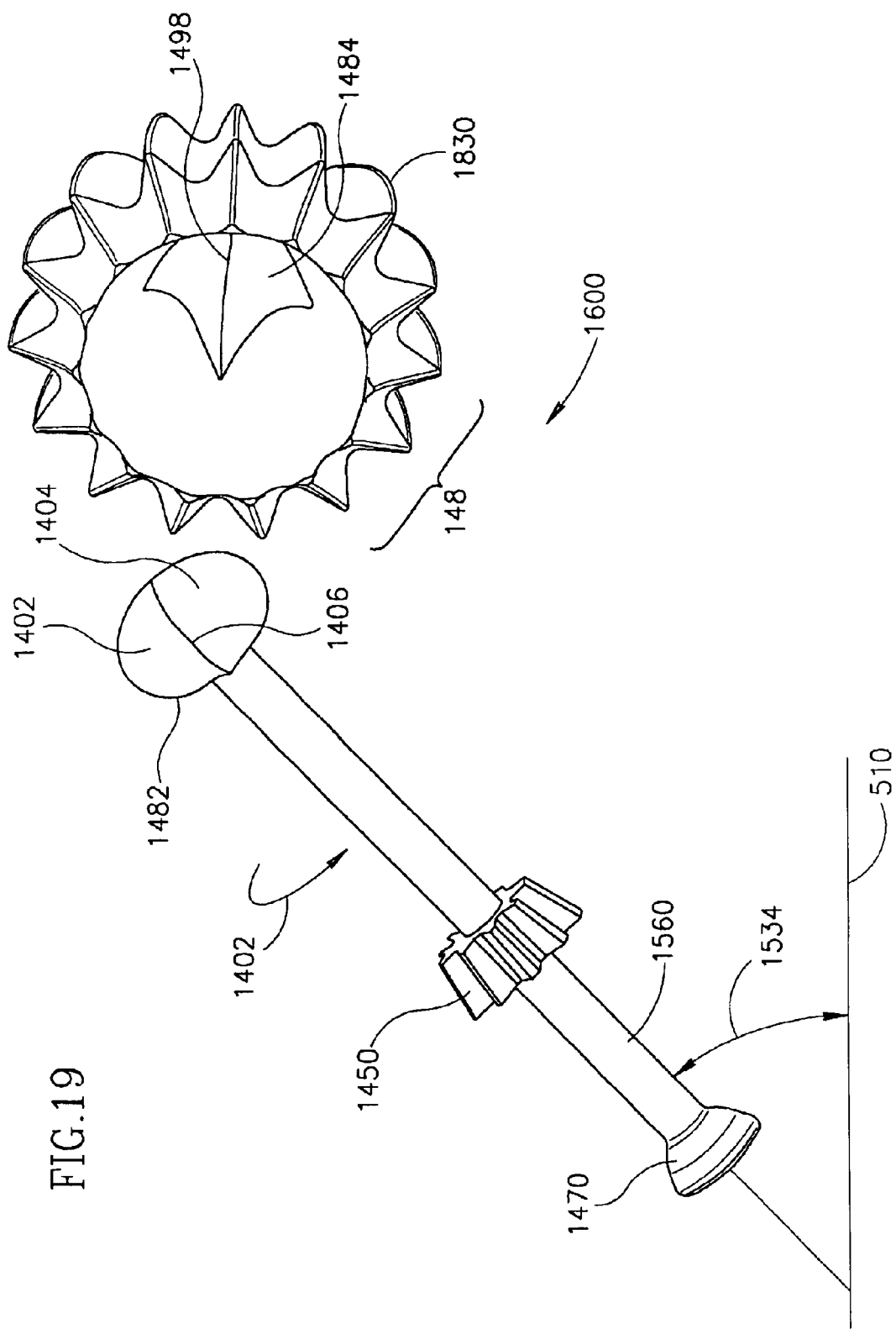

FIGS. 18 and 19 are detailed views of juicing pedestal 1600 demonstrating a joint 1480. Joint 1480 comprises a joint platform 1482 that slideably interfaces with a joint receptacle 1484, allowing element 1830 to maintain its vertical position during spin 1420. Joint platform 1482 has curved interfaces 1402 and 1404 that form a curved ridge 1406. Ridge 1406 slideably interfaces with a curved depression ridge 1498 to maintain element 1830 properly centered on post 1560 throughout spin 1420.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents that perform the same function, even if the structure or acts are different, as known in the art. Therefore, only the elements and limitations as used in the claims limit the scope of the invention.

What is claimed is:

1. A juicer for extracting juice from a fruit, comprising:
   a juicer element having an axis;
   a pivot operatively associated with and radially spaced from the juicing element axis, such that the juicing element axis is rotatable about the pivot; and
   a juicing element dish,
   wherein the juicing element projects above the dish; and
   the pivot is situated beneath the dish.

2. The juicer according to claim 1, wherein the pivot comprises at least one suction cup.

3. The juicer according to claim 1, wherein the dish comprises a lower surface and the pivot is removably connected to the lower surface.

4. The juicer according to claim 3, including one or more gliders projecting from the lower surface.

5. The juicer according to claim 4, wherein the one or more gliders comprise at least one wheel.

6. The juicer according to claim 4, wherein the one or more gliders are removably connected to the lower surface.

7. The juicer according to claim 1, wherein the juicing element comprises a conical surface.

8. The juicer according to claim 7, wherein the conical surface is curved in a plane including the axis of the juicing element, the curvature forming an apex.

9. The juicer according to claim 8, wherein the conical surface comprises one or more elongate ridges formed on the conical surface.

10. The juicer according to claim 9, wherein the one or more elongate ridges have a direction substantially toward the apex along the conical surface.

11. The juicer according to claim 1, wherein the juicing element is removably attached to the dish.

12. The juicer according to claim 11, including one or more curbs projecting from the dish that stabilize the juicing element on the dish.

13. A juicer for extracting juice from a fruit, comprising:
    a juicing element having an axis;
    a pivot operatively associated with and radially spaced from the juicing element axis, such that the juicing element axis is rotatable about the pivot;
    a juicing element dish, wherein the juicing element projects above the dish; and
    a receptacle situated beneath the dish, the receptacle having at least one upper surface, at least a portion of which is associated with receiving juice and at least one lower surface, the pivot projecting below said lower surface.

14. The juicer according to claim 13, wherein the pivot is removably connected to the lower surface.

15. The juicer according to claim 14, wherein the pivot comprises at least one suction cup.

16. The juicer according to claim 13, wherein the receptacle is removably attached to the dish.

17. The juicer according to claim 13, including one or more gliders that are connected to the lower surface.

18. The juicer according to claim 16, wherein the dish is formed with one or more perforations, such that extracted juice flows through the one or more perforations onto the receptacle.

19. The juicer according to claim 18, wherein the one or more perforations are adapted to at least partially strain the juice as the juice passes through the one or more perforations to the receptacle.

20. The juicer according to claim 19, wherein an edge portion of the dish is formed with an aperture, such that juice can be poured from the receptacle without removal of the receptacle from the dish.

21. The juicer according to claim 20, wherein the aperture is located in a corner of the dish so the corner acts as a sluice to direct the collected juice toward the aperture as the juicer is tilted and juice is poured out.

* * * * *